US005628924A

United States Patent [19]

Yoshimitsu et al.

[11] Patent Number: 5,628,924

[45] Date of Patent: May 13, 1997

[54] PLASMA ARC TORCH

[75] Inventors: Toshio Yoshimitsu, Oyama; Hitoshi Sato, Hiratsuka; Noriyuki Sekizawa, Hiratsuka; Yoshihiro Yamaguchi, Hiratsuka; Yoshitaka Niigaki, Hiratsuka; Yuuichi Takabayashi, Hiratsuka, all of Japan

[73] Assignee: Komatsu, Ltd., Tokyo, Japan

[21] Appl. No.: 507,461

[22] PCT Filed: Feb. 23, 1994

[86] PCT No.: PCT/JP94/00270

§ 371 Date: Aug. 24, 1995

§ 102(e) Date: Aug. 24, 1995

[87] PCT Pub. No.: WO94/19137

PCT Pub. Date: Sep. 1, 1994

[30] Foreign Application Priority Data

Feb. 24, 1993 [JP] Japan ............................... 5-012325 U

[51] Int. Cl.[6] .................................................... B23K 10/00

[52] U.S. Cl. ................................. 219/121.5; 219/121.52; 219/121.48; 219/119

[58] Field of Search ......................... 219/121.53, 121.52, 219/121.48, 121.5, 118, 119, 74, 75; 313/231.2, 331.3

[56] References Cited

U.S. PATENT DOCUMENTS 3,590,212 6/1971 Corrigal et al. ........................ 219/136
3,597,649 8/1971 Bykhovsky et al. .................... 313/211
3,909,581 9/1975 Stone et al. ............................. 219/120
4,575,606 3/1986 Safonnikov et al. .................. 219/73.1
5,103,072 4/1992 Eikeland et al. ................... 219/121.52
5,239,162 8/1993 Haun et al. ........................ 219/121.52

FOREIGN PATENT DOCUMENTS 40-6726 3/1965 Japan .
52-6932 2/1977 Japan .
61-271800 12/1986 Japan .
4-147772 5/1992 Japan .
4-167996 6/1992 Japan .

*Primary Examiner*—Mark H. Paschall
*Attorney, Agent, or Firm*—Sidley & Austin

[57] ABSTRACT

A plasma arc torch is provided which has a very long electrode lifetime, even if the number of times that an arc is generated and stopped is great. Improper electric discharge can be effectively prevented, and the lifetime can be increased due to the excellent resistance to heat. For this purpose, a metallic layer is provided in the portion where a pilot arc is generated, and the metallic layer contains at least one metal selected from the group consisting of gold and silver. The metallic layer is provided on the surface of the electrode holder, or on both of a surface of the electrode holder and a surface of the nozzle. Further, at least one of the electrode holder and the nozzle can be formed of aluminum or an aluminum alloy, and after the formation, an anodic oxide film can be formed on the surface thereof.

24 Claims, 4 Drawing Sheets

PLASMA ARC TORCH

TECHNICAL FIELD

The present invention relates to a plasma arc torch used for plasma cutting or plasma welding and, more particularly, to a plasma arc torch suitable for using a gas, containing oxygen, as the plasma gas.

BACKGROUND ART

A conventional plasma apparatus used for plasma cutting or plasma welding is shown in FIG. 4. A cross-section of the essential portion of the plasma arc torch of FIG. 4 is shown in FIG. 5. A plasma arc torch 1 for use with this plasma apparatus comprises an electrode 4, and a nozzle 5 made of copper and mounted so as to coaxially cover the electrode 4, wherein the electrode 4 and the nozzle 5 are electrically insulated from each other. In this electrode 4, an electrode element 2 having a high melting point is embedded in the tip of an electrode holder 3 made of copper or aluminum. Gas supply means 6 supplys a working gas between the electrode 4 and the nozzle 5, and a cooling water passage (not shown) for cooling the electrode 4 and the nozzle 5 is provided. Further, a high-frequency generating circuit 8 for causing insulation breakdown, and a DC power supply 9 for generating a main arc are connected to the plasma arc torch 1.

With such a construction, in operation, insulation breakdown A is first performed between the electrode 4 and the nozzle 5 by the high-frequency generating circuit 8. Next, the high-frequency generating circuit 8 is stopped, and a pilot current Ip is made to flow so that a pilot arc B is generated between the electrode 4 and the nozzle 5. When a main current Im is made to flow, electrical conduction can be obtained between the electrode 4 and a workpiece 7, and a main arc C is formed. Then, the pilot current Ip is shut off, and the main arc C is maintained between the electrode 4 and the workpiece 7. As a result, the workpiece 7 can be cut or welded satisfactorily.

However, in such a conventional plasma arc torch, when a plasma arc is generated and a workpiece is cut or welded, the electrode is consumed as a result of the generation of the plasma arc, and eventually the electrode will be unusable and have to be replaced. When the incidence of this replacement of this electrode is high, the operating cost is high, and many replacement operations must be performed, causing the operation efficiency to decrease.

In recent plasma cutting, there is an example in which oxygen is used as a working gas for cutting a soft steel plate. This example is widely used because the cutting speed and cutting quality of this type of cutting is higher than that of the plasma cutting in which an inert gas, such as nitrogen or argon, is used as a working gas. However, in a case where a gas containing oxygen is used as a working gas, the use of tungsten, which is a conventional electrode element material, is not practical since tungsten oxide has a low melting point and extremely low durability. To solve this problem, a method is known in which hafnium (Hf) is used as the electrode element, and an electrode having this material embedded in an electrode holder made of copper is used (refer to, for example, U.S. Pat. No. 3,597,649). However, even this electrode containing hafnium has a drawback in that the electrode is consumed earlier than an electrode containing tungsten which is used in an inert gas.

To solve this problem, several attempts have been made. One attempt is known in which the tip of an electrode and the inner and outer surface of a nozzle are electrically plated with nickel (Ni) or chromium (Cr) in order to prevent an arc from becoming unstable and to increase the lifetime of the electrode (refer to, for example, Japanese Patent Laid-Open No. 61-271800). Another attempt is known in which thermal conduction between the electrode element and the electrode holder made of copper is improved by disposing a spacer, formed of a gold or silver alloy, between the hafnium electrode element and the electrode holder made of copper, and the lifetime of the electrode is improved (refer to, for example, Japanese Patent Laid-Open No. 4-147772). However, the desired lifetime of the electrode cannot be achieved by these attempts. In particular, when the arc is generated and stopped frequently, the lifetime becomes extremely short.

In a cutting operation in which a conventional plasma arc torch is used, molten metal (dross) blows up when cutting starts. As a result of the deposition of this dross in the tip of the torch, the torch is likely to deteriorate or to be damaged. Furthermore, the tip of the torch is likely to conduct with a workpiece via the deposited dross, and an improper electric discharge, such as a double arc, occurs, causing the torch to be damaged. In addition, the electrode element for electric discharge is melted and damaged, a part of it is deposited in the nozzle or the like, causing a double arc to occur. Further, the melted electrode element for electric discharge causes the orifice hole in the tip of the nozzle to be deformed or blocked, thus causing a problem.

DISCLOSURE OF THE INVENTION

The inventors of the present invention conducted research in order to solve the problems of the prior art. The results show that the consumption of an electrode is greatly related to the circumstances where an arc is generated. That is, for generating a plasma arc, as shown in FIG. 5, first, insulation breakdown A is caused between the electrode 4 and the nozzle 5 by a high-frequency voltage, and a pilot arc B is generated. At this time, the insulation breakdown A is likely to occur at a place where the electrode 4 and the nozzle 5 are closest to each other, and the pilot arc B generated there moves in accordance with the flow of the working gas. The electric discharge points on the electrode 4 side and on the nozzle 5 side move toward the downstream in correspondence with the flow of the working gas. When the electric discharge point (the cathode point) on the electrode side moves to the electrode element 2 in the center of the tip of the electrode 4, the electric discharge point is fixed there by the action of the working gas. Also, the electric discharge point on the nozzle side moves toward the orifice section in the tip of the nozzle 5 over the inner surface of the nozzle 5, and reaches the exit of the nozzle. Next, led by the pilot arc B, electrical conduction is secured with the workpiece 7, and a main arc C is formed. Thereupon, the pilot current Ip (see FIG. 4) flowing between the electrode 4 and the nozzle 5 is shut off. An electric discharge of the main arc C is formed between the electrode 4 and the workpiece 7, and thus a state in which cutting or welding is possible is formed.

It was made clear that the electrode 4 is consumed greatly in the process in which the electric discharge point (the cathode point) on the electrode side is moved from the closest point between the nozzle 5 and the electrode 4 to the electrode element 2 in the center of the tip of the electrode 4 in the series of operations for generating the arc C, in particular, in the stage in which the pilot arc B is generated following the insulation breakdown A. That is, it became clear that the longer the time required for the cathode point to reach the electrode element 2, the earlier the electrode 4 is consumed. This is attributed to the fact that if a cathode point is present at a place other than the electrode element 2, i.e., in the electrode holder 3 made of copper, since copper cannot emit thermal electrons, the electrode holder melts and boils, and as a result of the generation of copper vapor, an electric discharge point is formed. Thus, the electrode holder 3 is consumed rapidly. Furthermore, when the electrode holder 3 is consumed, the arc is not stabilized after the electric discharge point is moved to the electrode element 2, and the consumption of the electrode element 2, is accelerated.

The present invention has been achieved to solve the above-described problems of the prior art. It is a first object of present invention to provide on the basis of the above-described clarifying research a plasma arc torch capable of considerably increasing the lifetime of an electrode, even if the number of times that the plasma arc is generated and terminated is great. It is a second object of the present invention to provide a plasma arc torch capable of effectively preventing an occurrence of an improper electric discharge and of increasing the lifetime by improving the resistance to heat.

According to a first aspect of the present invention, there is provided a plasma arc torch achieved mainly in correspondence with the first object. A metallic layer is provided in the place where a pilot arc is generated. This metallic layer in a plasma arc torch contains at least one metal selected from the group consisting of gold and silver. The metallic layer is provided on the surface of the electrode holder. This metallic layer can be provided on both of a surface of the electrode holder and a surface of the nozzle.

With such a construction, as a result of the rapid movement of the electric discharge point, such as a cathode point, to the surface of the electrode element in the center of the tip of the electrode, the electrode holder is less consumed. Thus, a plasma arc torch having increased electrode lifetime can be obtained.

According to a second aspect of the present invention, there is provided a plasma arc torch achieved mainly in correspondence with the second object, having at least one of the electrode holder and the nozzle formed of aluminum. An aluminum alloy can be used in place of aluminum. Further, after at least one of the electrode holder and the nozzle is formed of aluminum, an anodic oxide film is formed on the surface thereof.

With such a construction, when a working gas containing oxygen is supplied, the peripheral portion on the surface of the electrode holder made of aluminum or an alloy thereof, in particular, the surface of the electrode element, is oxidized, forming alumina ($Al_2O_3$), a strong film is formed, and the electrode is protected. On the other hand, similarly, a protective film is formed on the nozzle facing the electrode. Preformation of an anodic oxide film on the surface of the electrode holder and the nozzle makes it possible to prevent the anodic oxide film, having a high resistance to heat, from being melted and to increase the lifetime.

According to a third aspect of the present invention, there is provided a plasma arc torch achieved mainly in correspondence with the second object, in which a torch forming member facing a workpiece is formed of one selected from the group consisting of aluminum and an aluminum alloy, and an anodic oxide film is formed on the surface of the above-described forming member.

With such a construction, even when dross is deposited on the torch forming member facing a workpiece, such as a torch cap, improper electric discharge does not occur since the torch forming members are electrically insulated from each other, melting is prevented by the high resistance to heat, and thus the lifetime is increased.

BRIEF DESCRIPTION OF THE DRAWINGS

FIG. 2*a* is an illustration of the cross-section of the essential portion of the first embodiment;

FIG. 2*b* is an illustration of the cross-section of the essential portion of the second embodiment;

FIG. 2*c* is an illustration of the cross-section of the essential portion of the third embodiment; and FIG. 2*d* is an illustration of the cross-section of the essential portion of the fourth embodiment;

FIG. 3*a* is an illustration of the cross-section of the essential portion of the fifth embodiment;

FIG. 3*b* is an illustration of the cross-section of the essential portion of the sixth embodiment;

FIG. 3*c* is an illustration of the cross-section of the essential portion of the seventh embodiment;

THE BEST MODE FOR CARRYING OUT THE INVENTION

Preferred embodiments of a plasma arc torch of the present invention will be described below in detail with reference to the accompanying drawings.

Figure 1:
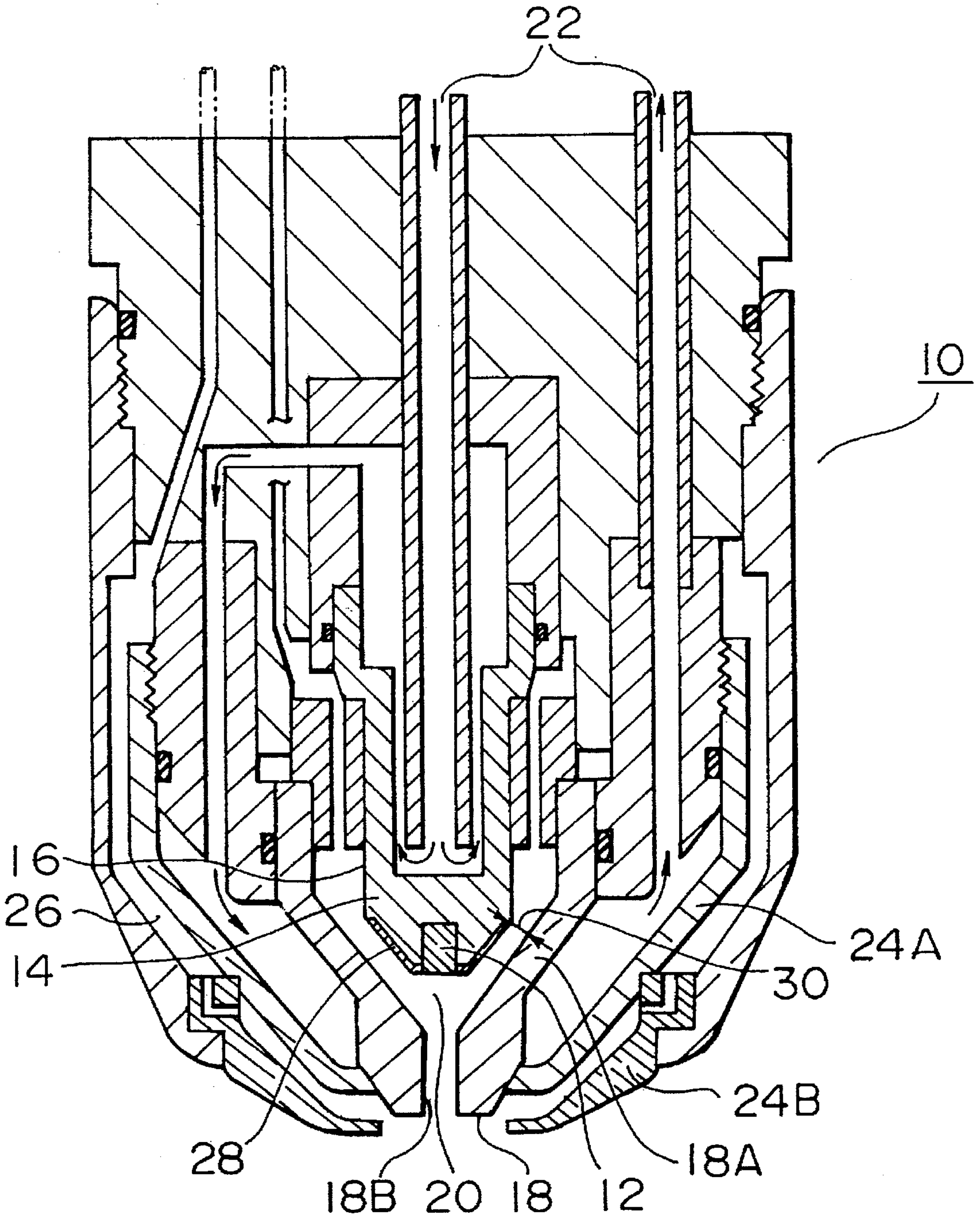
FIG. 1 is a sectional view of a plasma arc torch of a first embodiment in accordance with a first aspect of the present invention.
Figure 4:
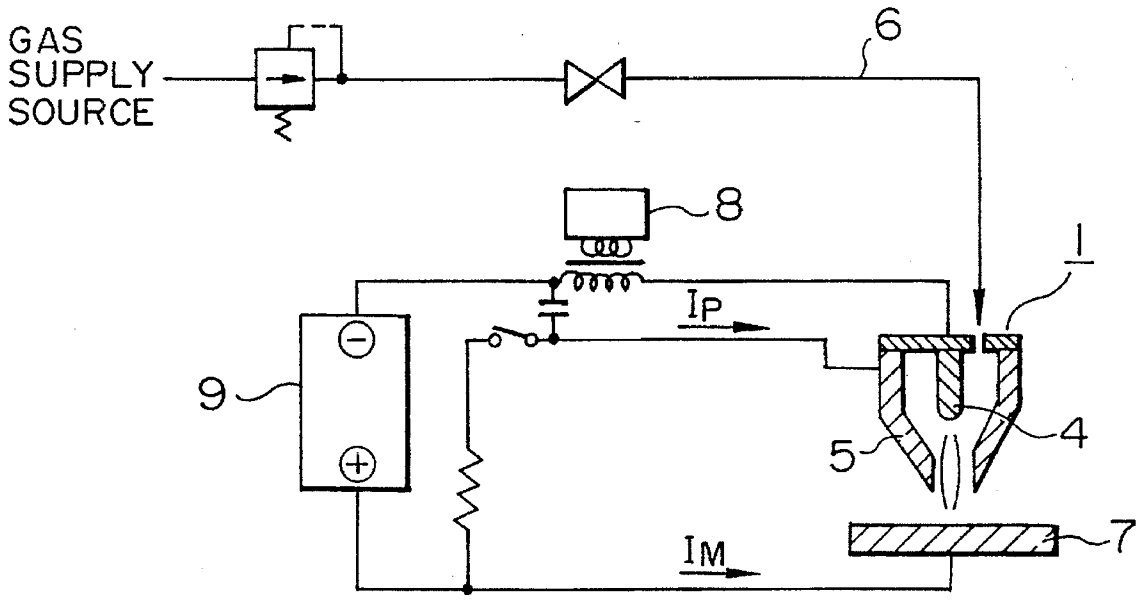
FIG. 4 PRIOR ART
FIG. 4 is an illustration of a plasma apparatus of the prior art.
Figure 5:
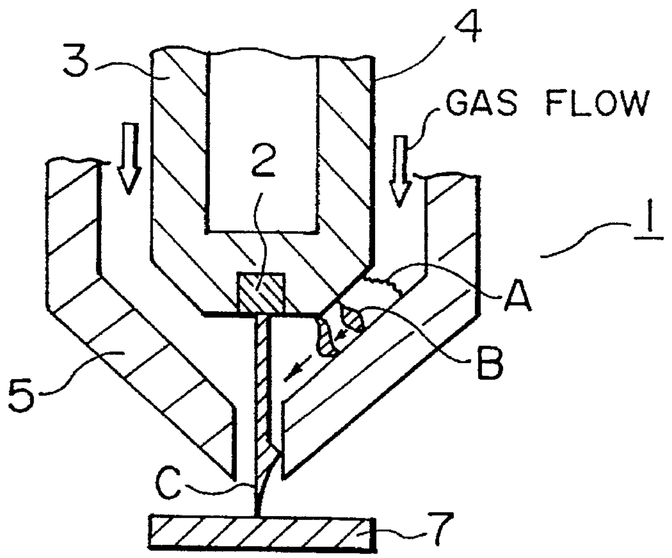
FIG. 5 PRIOR ART
FIG. 5 is an illustration of the cross-section of the essential portion of the plasma arc torch of FIG. 4.

The cross-section of a plasma arc torch in accordance with a first embodiment in accordance with a first aspect of the present invention is shown in FIG. 1. A plasma arc torch 10 comprises an electrode 16 having an electrode element 12 having a high melting point embedded in an electrode holder 14 made of copper, and a nozzle 18 made of copper and mounted so as to coaxially cover the electrode 16 outside of the tip of the electrode 16. The electrode 16 and the nozzle 18 are electrically insulated from each other. The tip of the electrode 16 is in the shape of a truncated cone having a frustoconical side surface and a flat end surface, and the electrode element 12 is embedded in the center of the flat end surface of the tip. In the nozzle 18, a working gas passage 20 is formed between the nozzle 18 and the electrode 16, and a throttle section 18A is formed facing the conical surface of the electrode 16. The nozzle 18 is provided with an open nozzle orifice 18B in the tip of the nozzle 18, and the electrode element 12 faces the nozzle orifice 18B. An inner cap 24A is provided exteriorly of the nozzle 18, and further an outer cap 24B is mounted outside the inner cap 24A. A part of cooling water passage 22, for cooling the electrode 16 and the nozzle 18, is formed between the nozzle 18 and the inner cap 24A, and a second working gas passage 26 is formed between the inner cap 24A and the outer cap 24B. A high-frequency generation circuit and a DC power supply (both of which are not shown) are connected to the plasma arc torch 10 in the same manner as in the conventional plasma apparatus (see FIG. 4). This DC power supply causes a pilot arc to be generated between the electrode 16 and the nozzle 18 following the insulation breakdown. When electrical conduction is secured between the electrode 16 and the workpiece under the guide of the pilot arc, the pilot arc is shut off so that a main arc is generated between the electrode 16 and the workpiece.

Figure 2A:
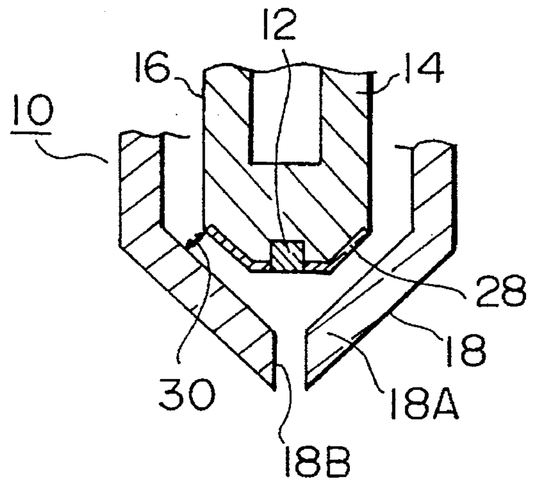
FIGS. 2*a* to 2*d* are illustrations of the cross-section of the essential portion of the first to fourth embodiments in accordance with the first aspect of the present invention.

The cross-section of the essential portion of this embodiment is shown in FIG. 2*a*. In this embodiment, a metallic film layer 28 containing gold or silver is provided on the surface of the electrode holder at the place where the pilot arc is generated. The reason why gold or silver is selected is that the research conducted by the inventors of the present invention revealed that the movement speed of the electric discharge point, such as a cathode point, depends upon the material from which the cathode point or the like is formed, and the order of the movement speed of the electric discharge point is: gold (Au)>silver (Ag)>copper (Cu)>nickel (Ni). In the plasma arc torch 10, a metallic film layer 28 containing gold or silver is formed on the outer surface of the electrode holder 14 from a portion 30, at which the electrode 16 faces the nozzle 18 and the distance between them is shortest, to the outer periphery of the electrode element 12. Needless to say, both gold and silver can be employed. As a method of manufacturing a film of gold or silver on the surface of the electrode holder 14, a common coating method, such as plating, vapor deposition or spraying, is effectively used. When this film is formed, a film containing gold or silver can be formed on the surface of the electrode element 12.

Next, a detailed construction of the second to fourth embodiments in accordance with a first aspect of the present invention will be described below. The basic construction of these embodiments is the same as that shown in FIG. 1, and different portions will be described.

Figure 2B:
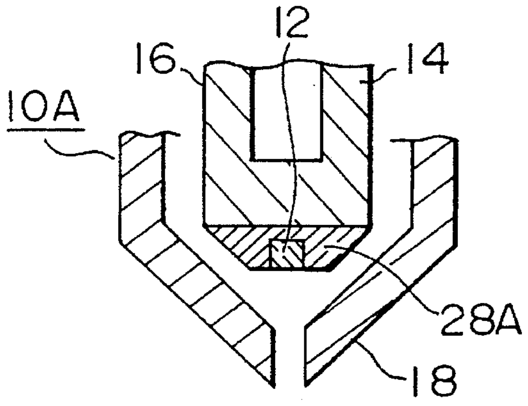

The cross-section of the essential portion of the second embodiment of the present invention is shown in FIG. 2*b*. In a plasma arc torch 10A of this embodiment, a member 28A, formed from a metal containing gold or silver, is manufactured beforehand, and the electrode element 12 is mounted therein by soldering, diffusion bonding, press fitting, etc. Thereafter, it is mounted in the base of the electrode holder 14, made of copper, by soldering or diffusion bonding.

Figure 2C:
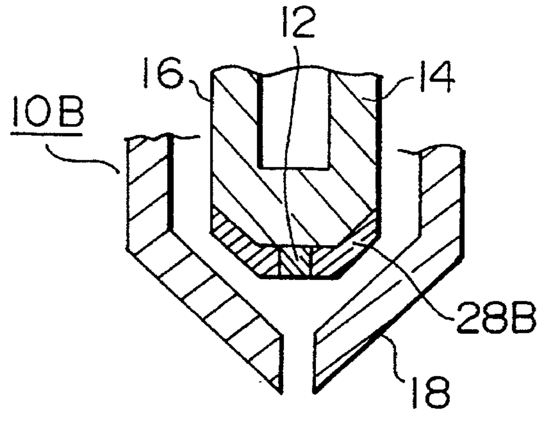

The cross-section of the essential portion of the third embodiment of the present invention is shown in FIG. 2*c*. In a plasma arc torch 10B of this embodiment, a metallic layer 28B containing gold or silver is poured in the tip of the base of the electrode holder 14.

Figure 2D:
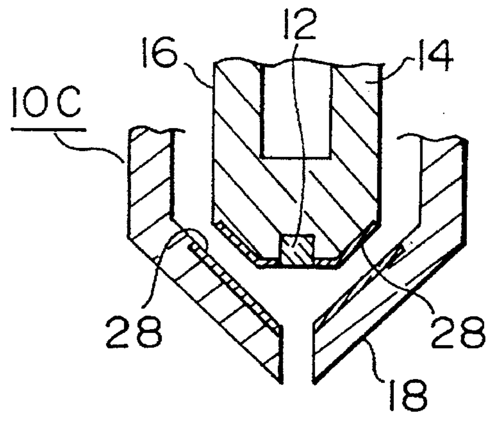

The cross-section of the essential portion of the fourth embodiment of the present invention is shown in FIG. 2*d*. In a plasma arc torch 10C of this embodiment, a metallic film layer 28 is formed on, not only the electrode 16, but also in the portion of the nozzle 18 at a place at which a pilot arc is generated.

Although the above-described first to fourth embodiments describe in detail examples in which the metallic layers 28, 28A and 28B containing gold or silver are formed at a place at which a pilot arc is generated, more preferably, the thickness of the metallic layers 28, 28A and 28B is relatively thick, for example, approximately the depth at which the electrode element 12 is embedded. The reason why this is more preferable is as follows. The electrode 16 can be used until the electrode element 12 is used up. However, the tip of the electrode holder 14 is also consumed by the generation of the arc even if the tip of the electrode 16 is formed of gold or silver. Therefore, to prevent the movement speed, of the cathode point while the arc is generated, from decreasing even if the tip of the electrode holder 14 is consumed, it is preferable that the metallic layers 28, 28A and 28B have a similar thickness.

The embodiments in accordance with the first aspect of the present invention are always effective for a case in which a working gas containing oxygen is used, and an electrode element 12 of hafnium, zirconium, etc. is used. These embodiments are also effective for a case in which an inert gas is used, and tungsten is used as an electrode element.

The operation of the above-described first to fourth embodiments of the present invention will be described below. The cathode point of a pilot arc generated following the insulation breakdown A (see FIG. 4) moves from the position of the insulation breakdown along the metallic layers 28, 28A and 28B provided in the electrode 16. Since the movement speed thereof is faster than that of the electrode holder whose surface is formed from copper, the electrode 16 is less consumed by the pilot arc. Further, since the metallic film layer 28 is formed in the nozzle 18, the electric discharge point on the nozzle 18 side is moved fast, and the electrode is less consumed. Furthermore, since the cathode point on the electrode 16 side is moved more easily in response to the above, the lifetime is improved more effectively. Therefore, the consumption of the electrode 16 caused by the movement of the cathode point is reduced, even in an operation in which the number of times that the arc is generated and stopped is great, and the lifetime of the electrode 16 can be increased greatly. Further, the lifetime of the nozzle 18 is increased, and a plasma arc torch having a low operating cost and improved operation efficiency can be obtained.

The plasma arc torch in accordance with the first aspect of the present invention has a lifetime improvement effect larger than that in which a spacer of a silver alloy is arranged between the electrode element and the electrode holder made of copper (for example, refer to the above-described Japanese Patent Laid-Open No. 4-147772) because there is no copper surface in the portion where the cathode point is formed when the arc is generated. Further, since the metallic layers 28, 28A and 28B are formed on the surface of the electrode 16, the necessary amount of gold or silver, which is an expensive metal, is less, an increase in the cost is limited, and the lifetime of the electrode 16 can be increased. More specifically, in the electrode 16 in accordance with the first aspect of the present invention, gold or silver can preferably be present on the surface of the tip of the electrode holder 14 where a cathode point may be formed when the arc is generated. For example, a metallic layer is formed from a position at which the distance to the nozzle 18 is smallest toward the downstream (the nozzle orifice side) of the working gas. Therefore, the remaining portion can be formed of copper, aluminum, etc., which is inexpensive, is easily processed and has a high thermal conduction.

Next, the fifth to seventh embodiments of a plasma arc torch in accordance with a second aspect of the present invention will be described below. The basic construction of the plasma arc torch used in these embodiments is the same as that of the plasma arc torch 10 of the first embodiment, and will be described with reference to the figures showing the essential portions of the present invention. In these embodiments, a gas containing oxygen is used as the working gas.

Figure 3A:
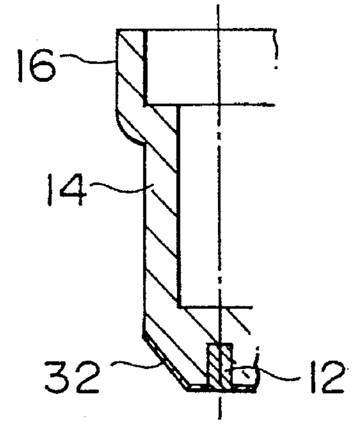
FIGS. 3*a* to 3*c* are illustrations of the cross-section of the essential portion of fifth to seventh embodiments in accordance with a second aspect of the present invention.

In the fifth embodiment, as shown in FIG. 3*a*, the entire electrode holder 14 is formed of aluminum, and an anodizing ($Al_2O_3$) process is performed on the surface where the pilot arc is generated, thus forming a film 32. As an anodizing process, a sulfuric acid process, an oxalic acid process, a chromic acid process, or other organic acid processes are applicable. Since anodic oxide films are generally porous, it is preferable that an operation for sealing the pores be performed to improve the resistance to corrosion even more. In this process, hydration of the anodic oxide film with high-temperature water is made to proceed, and the film is formed into boehmite so as to seal the hole. An anodic oxide film 32, from several μM to 100 μm thick, is applicable, and, more preferably, the thickness is from 50 to 100 μm as a plasma arc torch part. The comparison of the hardness, the melting point, and the electrical resistance of the anodic oxide film 32 with those of copper and steel used as a component material of the plasma arc torch part is shown in Table 1.

| | Anodic oxide film | Copper | Steel |
|---|---|---|---|
| Hardness (HV) | 600 | 100 | about 300 |
| Melting point (°C.) | 2100 | 1083 | about 1500 |
| Electric resistance (Ωcm) | $8 \times 10^{14}$ | $1.7 \times 10^{-6}$ | $16 \times 10^{-6}$ |

As can be seen in Table 1, the anodic oxide film 32 features excellent heat resistance and electrical insulating property. When this is employed for the component of the plasma arc torch, it is possible to increase the lifetime.

Figure 3B:
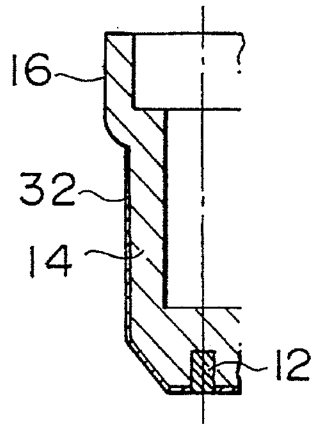

FIG. 3*b* shows the sixth embodiment. While in the fifth embodiment the anodic oxide film 32 is formed on the surface of the portion of the electrode holder 14 where electric discharge is generated, in this embodiment, the anodic oxide film 32 is extendedly formed up to the outer surface of the upper portion of the electrode holder 14. Therefore, since this protective film is formed over a wide range on the outer surface of the electrode holder 14, a melting damage reduction effect is high, and it is possible to prevent improper electric discharge caused by the spattering of the melting-damaged electrode and the deposition thereof on the nozzle 18.

Figure 3C:
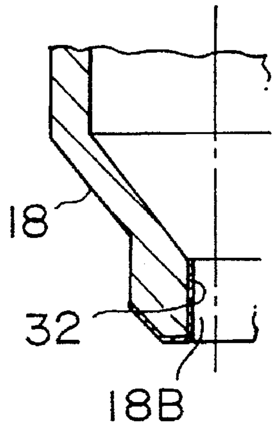

FIG. 3*c* shows the seventh embodiment in which the nozzle 18 is formed of aluminum or an alloy material thereof, and the anodic oxide film 32 is formed on the outer surface of the tip of the nozzle 18 and the inner surface of the nozzle orifice 18B. It is a matter of course that the anodic oxide film 32 is not formed in the electric conduction portion in the upper end portion of the nozzle 18. As a result of the formation of the anodic oxide film 32 in a portion other than the electric conduction portion of the nozzle 18, it is possible to increase the resistance to heat.

Next, a plasma arc torch of eighth and ninth embodiments in accordance with a third aspect of the present invention will be described below. The basic construction of the plasma arc torch used in these embodiments is the same as that of the plasma arc torch 10 of the first embodiment, and will be described with reference to the figures showing the essential portions of the present invention. In these embodiments, a gas containing oxygen is used as a working gas.

Figure 3D:
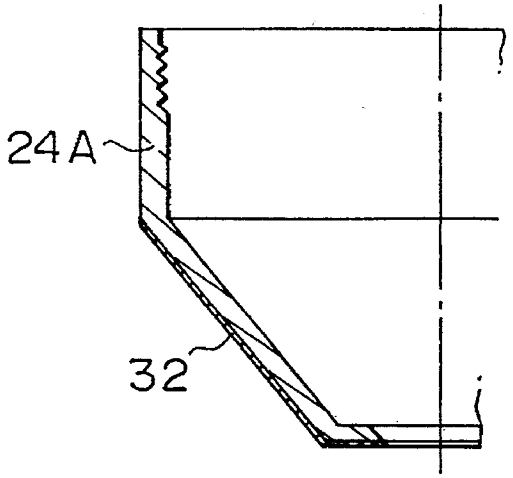
FIG. 3*d* is an illustration of the cross-section of the essential portion of an inner cap of an eighth embodiment in accordance with the third aspect of the present invention.
Figure 3E:
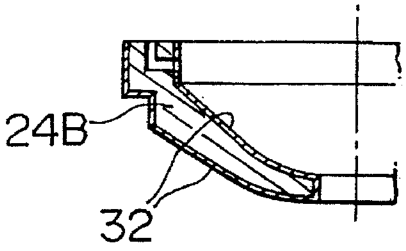
FIG. 3*e* is an illustration of the cross-section of the essential portion of an outer cap of a ninth embodiment in accordance with a third aspect of the present invention.

FIG. 3*d* shows the eighth embodiment in which the inner cap 24A, which is mounted outside the nozzle 18 (see FIG. 1) and which is a torch forming member facing the workpiece, is a target. This inner cap 24A is formed of aluminum or an alloy thereof, and the anodic oxide film 32 is formed on the outer surface of the tip of the inner cap 24A. FIG. 3*e* shows the ninth embodiment in which the outer cap 24B for a sealed gas, which is a torch forming member facing the workpiece, is a target. This outer cap 24B is formed of aluminum or an alloy thereof, and the anodic oxide film 32 is formed on the inner and outer surfaces.

Also, with such a construction in the embodiment in accordance with the third aspect of the present invention, resistance to heat can be improved, and improper electric discharge can be prevented. In particular, during a cutting operation, it is possible to prevent, by means of a high electrical insulation effect, an arc from being generated, which arc is likely to occur between the workpiece and the electrode even if dross is deposited, and the function for preventing a double arc is high.

In the above-described fifth to ninth embodiments of the present invention, after the plasma arc torch parts are formed of aluminum and an alloy thereof, the anodic oxide film 32 is formed in a predetermined portion of the surface of these parts. When a gas containing oxygen is used as a working gas, the formation of the anodic oxide film 32 can be omitted. That is, plasma cutting is started, an arc is generated between the electrode 16 and the nozzle 18, finally reaches a workpiece, and this workpiece is cut. When the working gas is an oxygen atmosphere, the portion of the electrode holder 14 where electric discharge is performed, in particular, the peripheral portion of the electrode element 12, is formed into Alumite and a strong alumina film is formed, and this film will work to protect the electrode 16. Also, the portion of the nozzle 18 facing the electrode 16 and the nozzle orifice 18B are similarly oxidized to form a protective oxidized film. Therefore, when a gas containing oxygen is used as a working gas, it is possible to sufficiently increase the lifetime by merely forming the electrode 16 and the nozzle 18 of aluminum or an alloy thereof.

Up to this point, the preferred embodiments of the plasma arc torch of the present invention have been described in detail. The present invention is not limited to the above-described embodiments. The plasma arc torch per se to which the present invention is applied is able to obtain the same advantages as those described above even for an ordinary plasma arc torch. The present invention is applicable to a wide range, as in a torch having no cap in the outer peripheral portion, or a torch having no cooling water passage, etc. In addition, needless to say, a plasma arc torch in which the first to third aspects of the present invention are combined as required is useful.

INDUSTRIAL APPLICABILITY

According to the present invention, the lifetime of the electrode is very long, even if the number of times that an arc is generated and stopped is great, and improper electric discharge can be effectively prevented. Also, the present invention is useful as a plasma arc torch for plasma cutting or plasma welding, capable of increasing the lifetime due to the satisfactory resistance to heat.

We claim:

1. A plasma arc torch, comprising:

an electrode comprising an electrode holder and an electrode element, said electrode holder having a tip portion, said tip portion having an outer side surface and an end surface, said electrode element having a high melting point and being embedded in said end surface of said tip portion of said electrode holder;

a nozzle which is electrically insulated from the electrode, said nozzle being positioned coaxially with and exteriorly of said electrode, said nozzle being provided with a nozzle orifice so that said electrode element faces said nozzle orifice, and a working gas passage between said outer side surface of said tip portion of said electrode holder and said nozzle for supplying a working gas, wherein, upon application of a high frequency voltage, insulation breakdown occurs in a section of said working gas passage between said outer side surface of said tip portion of said electrode holder and said nozzle so that a pilot arc can be generated and the thus generated pilot arc moves, with flow of working gas through said working gas passage, downstream along said outer side surface of said tip portion of said electrode holder to said electrode element, wherein said outer side surface of said tip portion of said electrode holder has an electrode surface which faces said nozzle across said section of said working gas passage, wherein said nozzle has a nozzle surface which faces said electrode surface across said section of said working gas passage, and wherein at least one of said electrode surface and said nozzle surface comprises at least one metal selected from the group consisting of gold and silver.

2. A plasma arc torch in accordance with claim 1, wherein said electrode surface comprises at least one metal selected from the group consisting of gold and silver.

3. A plasma arc torch in accordance with claim 2 wherein said tip portion has a shape of a truncated cone with said outer side surface of said tip portion being a frustoconical side surface, wherein said electrode element has a surface exposed to said working gas passage, wherein said nozzle has a throttle section facing said frustoconical side surface, and wherein said electrode surface extends downstream from a portion of said throttle section, where a distance between said nozzle and said electrode holder is at a minimum, to an outer periphery of said electrode element.

4. A plasma arc torch in accordance with claim 2, wherein said tip portion has a shape of a truncated cone with said outer side surface of said tip portion being a frustoconical side surface, wherein said electrode element has a surface exposed to said working gas passage, and wherein said electrode surface comprises said frustoconical side surface and said end surface.

5. A plasma arc torch in accordance with claim 4, wherein said electrode holder comprises a body having a layer formed on an outer side surface of the body, said layer comprising at least one metal selected from the group consisting of gold and silver, said layer constituting said electrode surface.

6. A plasma arc torch in accordance with claim 5, wherein said layer has a thickness which is similar to a thickness of said electrode element.

7. A plasma arc torch in accordance with claim 5, wherein said layer is a film layer.

8. A plasma arc torch in accordance with claim 5, wherein said layer is a member having a thickness which is greater than a thickness of said electrode element, and said electrode element is embedded in said member.

9. A plasma arc torch in accordance with claim 5, wherein said body comprises copper.

10. A plasma arc torch in accordance with claim 1, wherein said nozzle surface comprises at least one metal selected from the group consisting of gold and silver.

11. A plasma arc torch in accordance with claim 10, wherein said tip portion has a shape of a truncated cone with said outer side surface being a frustoconical side surface, wherein said electrode element has a surface exposed to said working gas passage, wherein said nozzle has a throttle section facing said frustoconical side surface, and wherein said nozzle surface extends from a portion of said throttle section, where a distance between said nozzle and said electrode is at a minimum, to said orifice.

12. A plasma arc torch in accordance with claim 11, wherein said electrode surface comprises at least one metal selected from the group consisting of gold and silver.

13. A plasma arc torch in accordance with claim 12, wherein said electrode surface extends downstream from said portion of said throttle section to an outer periphery of said electrode element.

14. A plasma arc torch in accordance with claim 1, wherein at least one of said electrode holder and said nozzle comprises aluminum.

15. A plasma arc torch, comprising:

an electrode comprising an electrode holder and an electrode element, said electrode holder having a tip portion, said tip portion having an outer side surface and an end surface, said electrode element having a high melting point and being embedded in said end surface of said tip portion of said electrode holder;

a nozzle which is electrically insulated from the electrode, said nozzle being positioned coaxially with and exteriorly of said electrode, said nozzle being provided with a nozzle orifice in a tip of said nozzle so that said electrode element faces said nozzle orifice, and a working gas passage between said outer side surface of said tip portion of said electrode holder and said nozzle for supplying a working gas, wherein, upon application of a high frequency voltage, insulation breakdown occurs in a section of said working gas passage between said outer side surface of said tip portion of said electrode holder and said nozzle so that a pilot arc can be generated and the thus generated pilot arc moves, with flow of working gas through said working gas passage, downstream along said outer side surface of said tip portion of said electrode holder to said electrode element, wherein said outer side surface of said tip portion of said electrode holder has an electrode surface which faces said nozzle across said section of said working gas passage, wherein said nozzle has a nozzle surface which faces said electrode surface across said section of said working gas passage, and wherein at least one of said electrode surface and said nozzle surface is formed of a material comprising anodized aluminum.

16. A plasma arc torch in accordance with claim 15, wherein said electrode holder comprises aluminum, and wherein said electrode surface comprises anodized aluminum.

17. A plasma arc torch in accordance with claim 15, wherein said electrode holder is formed of a material selected from the group consisting of aluminum and aluminum alloys, and wherein said electrode surface comprises anodized aluminum.

18. A plasma arc torch in accordance with claim 16, wherein said electrode surface is an anodic oxide film.

19. A plasma arc torch in accordance with claim 16, wherein said electrode surface is formed by a layer comprising boehmite.

20. A plasma arc torch in accordance with claim 16, wherein said electrode surface includes all surface of said electrode holder which is exposed to said working gas passage between said electrode holder and said nozzle.

21. A plasma arc torch in accordance with claim 15, wherein said nozzle comprises aluminum, and wherein said nozzle surface comprises anodized aluminum.

22. A plasma arc torch in accordance with claim 15, wherein said nozzle is formed of a material selected from the group consisting of aluminum and aluminum alloys, and wherein said nozzle surface comprises anodized aluminum.

23. A plasma arc torch in accordance with claim 21, wherein an inner surface of said nozzle orifice and an outer surface of said tip of said nozzle is an anodic oxide film.

24. A plasma arc torch in accordance with claim 21, wherein an inner surface of said nozzle orifice and an outer surface of said tip of said nozzle is formed by a layer comprising boehmite.

* * * * *